United States Patent [19]

Ramamurthy

[11] Patent Number: 4,554,120
[45] Date of Patent: * Nov. 19, 1985

[54] PROCESS FOR ELIMINATING SURFACE MELT FRACTURE DURING EXTRUSION OF THERMOPLASTIC POLYMERS

[75] Inventor: Arakalgud V. Ramamurthy, Somerset, N.J.

[73] Assignee: Union Carbide Corporation, Danbury, Conn.

[ * ] Notice: The portion of the term of this patent subsequent to Jun. 11, 2002 has been disclaimed.

[21] Appl. No.: 627,517

[22] Filed: Jul. 3, 1984

Related U.S. Application Data

[63] Continuation-in-part of Ser. No. 508,667, Jun. 28, 1983, abandoned.

[51] Int. Cl.[4] .............................................. B29F 3/04
[52] U.S. Cl. ..................................... 264/85; 264/169;
264/176 R; 264/564; 264/211; 425/378 R;
425/379 R; 425/380; 425/461; 425/467
[58] Field of Search ................... 264/176 R, 169, 564,
264/211, 85; 425/380, 461, 467, 378 R, 379 R

[56] References Cited

U.S. PATENT DOCUMENTS

| | | | |
|---|---|---|---|
| 3,125,547 | 3/1964 | Blatz | 525/231 |
| 3,382,535 | 5/1968 | Ferrari | 425/461 |
| 3,879,507 | 4/1975 | Cavanna et al. | 264/51 |
| 3,920,782 | 11/1975 | Cogswell | 264/176 R |
| 4,080,138 | 3/1978 | Hutchinson et al. | 425/467 |
| 4,243,619 | 1/1981 | Fraser et al. | 264/40.6 |
| 4,282,177 | 8/1981 | Kurtz et al. | 264/564 |
| 4,329,314 | 5/1982 | Jackson et al. | 425/326.1 |
| 4,342,848 | 8/1982 | Blanchard et al. | 525/231 |
| 4,348,349 | 9/1982 | Kurtz | 264/564 |
| 4,360,494 | 11/1982 | Kurtz | 425/461 |

FOREIGN PATENT DOCUMENTS 55-21222  2/1980  Japan ................................. 425/461

Primary Examiner—Jeffery Thurlow
Attorney, Agent, or Firm—Clement J. Vicari

[57] ABSTRACT

A process and apparatus as provided for substantially eliminating surface melt fracture during extrusion of a thermoplastic polymer such as a molten narrow molecular weight distribution, linear, ethylene copolymer, by using a die having a die land region defining opposing surfaces at least one of which is fabricated from an alloy containing 5 to 95 parts by weight zinc and 95 to 5 parts by weight of copper.

32 Claims, 4 Drawing Figures

PROCESS FOR ELIMINATING SURFACE MELT FRACTURE DURING EXTRUSION OF THERMOPLASTIC POLYMERS

This application is a continuation-in-part of application Ser. No. 508,667 filed on June 28, 1983 now abandoned and assigned to a common assignee.

FIELD OF THE INVENTION

This invention relates to a process and apparatus for substantially eliminating melt fracture, particularly surface melt fracture, during extrusion of thermoplastic polymers susceptible to melt fracture, under conditions of flow rate and melt temperature which would otherwise produce such melt fracture.

In a more specific aspect, the invention relates to a process for substantially eliminating surface melt fracture during extrusion of a molten narrow molecular weight distribution, linear, ethylene copolymer, under conditions of flow rate and melt temperature which would otherwise produce such melt fracture.

BACKGROUND OF THE INVENTION

Most commercial low density polyethylenes are polymerized in heavy walled autoclaves or tubular reactors at pressures as high as 50,000 psi and temperatures up to 300° C. The molecular structure of high pressure low density polyethylene is highly complex. The permutations in the arrangement of its simple building blocks are essentially infinite. High pressure resins are characterized by an intricate long chain branched molecular architecture. These long chain branches have a dramatic effect on the melt rheology of the resins. High pressure low density polyethylene resins also possess a spectrum of short chain branches generally 1 to 6 carbon atoms in length which control resin crystallinity (density). The frequency distribution of these short chain branches is such that, on the average, most chains possess the same average number of branches. The short chain branching distribution characterizing high pressure low density polyethylene can be considered narrow.

The term "linear" is defined as identifying a polymer chain which is predominantly free of long chain branching. By "predominantly free of long chain branching" is meant less than 0.5 branches/per 1000 carbon atoms in the polyethylene molecule. "Long chain branching" characterizes branching within polymeric structures which exceeds short branch lengths of pendant groups derived from individual alpha-olefin comonomers. A long chain branch of polyethylene should have at least a sufficient number of carbon atoms to provide significant modifications in rheological behavior, such as caused by chain entanglement. The minimum number of carbon atoms is usually greater than about 100. Short chain branching introduced through comonomer polymerization provides branch lengths of usually less than about 10 carbon atoms per branch. Noncrosslinked LLDPE possesses little, if any, long chain branching such that the only branching to speak of is short chain branching, with such branch length controlled by the pendant chain length of the comonomeric alpha-olefins provided.

The term "narrow molecular weight distribution" as used herein refers to the ratio of weight average molecular weight to number average molecular weight. This ratio can be between 1 and about 10, preferably between about 2 to about 6.5, and most preferably between about 3 to about 5. The lower limit of this ratio is defined by the theoretical limit since number average molecular weight cannot exceed weight average molecular weight by definition.

Low density polyethylene can exhibit a multitude of properties. It is flexible and has a good balance of mechanical properties such as tensile strength, impact resistance, burst strength, and tear strength. In addition, it retains its strength down to relatively low temperatures. Certain resins do not embrittle at temperatures as low as −70° C. Low density polyethylene has good chemical resistance, and it is relatively inert to acids, alkalis, and inorganic solutions. It is, however, sensitive to hydrocarbons, halogenated hydrocarbons, and to oils and greases. Low density polyethylene has excellent dielectric strength.

More than 50% of all low density polyethylene is processed into film. This film is primarily utilized in packaging applications such as for meat, produce, frozen food, ice bags, boilable pouches, textile and paper products, rack merchandise, industrial liners, shipping sacks, pallet stretch and shrink wrap. Large quantities of wide heavy gauge film are used in construction and agriculture.

Most low density polyethylene film is produced by the tubular blown film extrusion process. Film products made by this process range in size, from tubes which are about two inches or less in diameter, and which are used as sleeves or pouches, to huge bubbles that provide a lay flat of up to about twenty feet in width, and which, when slit along an edge and opened up, will measure up to about forty feet in width.

Polyethylene can also be produced at low to medium pressures by homopolymerizing ethylene or copolymerizing ethylene with various alpha-olefins using heterogeneous catalysts based on transition metal compounds of variable valence. These resins generally possess little, if any, long chain branching and the only branching to speak of is short chain branching. Branch length is controlled by comonomer type. Branch frequency is controlled by the concentration of comonomer(s) used during copolymerization. Branch frequency distribution is influenced by the nature of the transition metal catalyst used during the copolymerization process. The short chain branching distribution characterizing transition metal catalyzed low density polyethylene can be very broad.

Linear low density polyethylene can also be produced by high pressure techniques as is known in the prior art.

U.S. Pat. No. 4,302,566 in the names of F. J. Karol et al and entitled Preparation of Ethylene Copolymers in Fluid Bed Reactor, discloses that ethylene copolymers, having a density of 0.91 to 0.96, a melt flow ratio of greater than or equal to 22 to less than or equal to 32 and a relatively low residual catalyst content can be produced in granular form, at relatively high productivities if the monomer(s) are copolymerized in a gas phase process with a specific high activity Mg-Ti containing complex catalyst which is blended with an inert carrier material.

U.S. Pat. No. 4,302,565 in the names of G. L. Goeke et al and entitled Impregnated Polymerization Catalyst, Process for Preparing, and Use for Ethylene Copolymerization discloses that ethylene copolymers, having a density of 0.91 to 0.96, a melt flow ratio of greater than or equal to 22 to less than or equal to 32 and a relatively low residual catalyst content can be produced in granular form, at relatively high productivities, if the monomer(s) are copolymerized in a gas phase process with a specific high-activity Mg-Ti-containing complex catalyst which is impregnated in a porous inert carrier material.

The polymers as produced, for example, by the processes of said applications using the Mg-Ti containing complex catalyst possess a narrow molecular weight distribution, Mw/Mn, of about greater than or equal to 2.7 or less than or equal to 4.1.

Low Density Polyethylene: Rheology

The rheology of polymeric materials depends to a large extent on molecular weight and molecular weight distribution.

In film extrusion, two aspects of rheological behavior are important: shear and extension. Within a film extruder and extrusion die, a polymeric melt undergoes severe shearing deformation. As the extrusion screw pumps the melt to, and through, the film die, the melt experiences a wide range of shear rates. Most film extrusion processes are thought to expose the melt to shear at rates in the 100–5000 $sec^{-1}$ range. Polymeric melts are known to exhibit what is commonly termed shear thinning behavior, i.e., non-Newtonian flow behavior. A shear rate is increased, viscosity (the ratio of shear stress, $\tau$, the shear rate, $\lambda$) decreases. The degree of viscosity decrease depends upon the molecular weight, its distribution and molecular configuration, i.e. long chain branching of the polymeric material. Short chain branching has little effect on shear viscosity. In general, high pressure low density polyethylenes have a broad molecular weight distribution and show enhanced shear thinning behavior in the shear rate range common to film extrusion. The narrow molecular weight distribution resins used in the present invention exhibit reduced shear thinning behavior at extrusion grade shear rates. The consequences of these differences are that the narrow distribution resins used in the present invention require higher power and develop higher pressures during extrusion than the high pressure low density polyethylene resins of broad molecular weight distribution and of equivalent average molecular weight.

The rheology of polymeric materials is customarily studied in shear deformation. In simple shear, the velocity gradient of the deforming resin is perpendicular to the flow direction. The mode of deformation is experimentally convenient but does not convey the essential information for understanding material response in film fabrication processes. As one can define a shear viscosity in terms of shear stress and shear rate, i.e.:

$$\eta \text{ shear} = \tau_{12}/\lambda$$

where
$\eta$ shear = shear viscosity (poise)
$\tau_{12}$ = shear stress (dynes/cm$^2$)
$\lambda$ = shear rate (sec$^{-1}$)
an extensional viscosity can be defined in terms of normal stress and strain rate, i.e.,:

$$\eta \text{ ext} = \pi/\epsilon$$

$\eta$ ext = extensional viscosity (poise)
$\pi$ = normal stress (dynes/cm$^2$)
$\epsilon$ = strain rate (sec$^{-1}$)

During extrusion of a high molecular weight ethylene polymer having a narrow molecular weight distribution through dies, as with other such polymeric materials, "melt fracture" occurs when the extrusion rate exceeds a certain critical value. "Melt Fracture" is a general term used by the polymer industry to describe a variety of extrudate irregularities observed during extrusion of molten polymers. The occurrence of melt fracture severely limits the rate at which acceptable products can be fabricated under commercial conditions. The occurrence of melt fracture was first described by Nason in 1945 and since then several investigators have studied this in an attempt to understand the underlying mechanism(s) for its occurrence. C. J. S. Petrie and M. M. Denn (Amer. Inst. Chem. Engrs. Journal, Vol. 22, pages 209–236, 1976) have presented a critical review of the literature which indicates that the present understanding of the mechanism(s) leading to melt fracture is far from complete.

The melt fracture characteristics of a molten polymer is usually studied using a capillary rheometer. The polymer at a given temperature is forced through a capillary die of known dimensions at a given flow rate. The pressure required is noted and the emerging extrudate is examined for surface characteristics.

The extrudate surface characteristics of linear low density polyethylene (LLDPE) resins, as determined with a capillary rheometer are typical of many linear narrow distribution polymers. They indicate that at low shear stresses (less than approximately 20 psi), the emerging extrudates from a capillary die are smooth and glossy. At a critical shear stress (approximately 20–22 psi), the extrudates exhibit loss of surface gloss. The loss of gloss is due to fine scale roughness of the extrudate surface which can be perceived under a microscope at a moderate magnification (20–40×). This condition represents the "onset" of surface irregularities and occurs at a critical shear stress in the die. Above the critical stress, two main types of extrudate melt fracture can be identified with LLDPE resins: surface melt fracture and gross melt fracture. The surface melt fracture occurs over a shear stress range of approximately 20–65 psi and results in increasing severity of surface roughness. In its most severe form, it appears as "sharkskin". The surface irregularities occur under apparently steady flow conditions. That is, no fluctuation in either the pressure or the flow rate is observed with time. At a shear stress of approximately 65 psi, the flow becomes unsteady when both the pressure and the flow rate fluctuate between two extremes and the emerging extrudates correspondingly exhibit smooth and rough surfaces. This is the onset of gross melt fracture and has been a subject of intense investigation by several investigators because of its severity. With further increase in shear stress, the extrudates become totally distorted and show no regularity.

Several mechanisms have been proposed in the literature for the occurrence of surface and gross melt fracture. Surface melt fracture of the sharkskin type has been proposed to be due to effects at the die exit where the viscoelastic melt is subjected to high local stresses as it parts company with the die surface. This leads to cyclic build up and release of surface tensile forces at the die exit resulting in the observed surface melt fracture. Another mechanism for surface melt fracture proposes differential recovery, due to the elasticity between the skin and core of the extrudate as a primary cause. On the other hand, gross metal fracture has been proposed to be due to die land and/or die entry effects.

The proposed mechanisms include: "slip-stick" in the die land region; tearing of the melt in the die entry region due to exceeding the melt strength; and, propagation of spiralling flow instabilities in the die entry region.

Under commercial film fabrication conditions (shear stress range approximately 25–65 psi) with conventional blown films dies, predominantly surface melt fracture of the sharkskin type occurs with LLDPE resins resulting in commercially unacceptable products.

There are several methods for eliminating surface melt fracture under commercial film fabrication conditions. These are aimed at reducing the shear stresses in the die and include: increasing the melt temperature; modifying the die geometry; and use of slip additives in the resin to reduce friction at the wall. Increasing the melt temperature is not commercially useful since it lowers the rate for film formation due to bubble instabilities and heat transfer limitations. Another method for eliminating sharkskin is described in U.S. Pat. No. 3,920,782. In this method, surface melt fracture formed during extrusion of polymeric materials is controlled or eliminated by cooling an outer layer of the material, so it emerges from the die with a reduced temperature while maintaining the bulk of the melt at the optimum working temperature. However, this method is difficult to employ and control.

The invention of U.S. Pat. No. 3,920,782 is apparently based on the inventor's conclusions that the onset of surface melt fracture under his operating conditions with his resins is a function, basically, of exceeding a critical linear velocity with his resins through his dies at his operating temperatures. In the process of the present invention, however, the onset of surface melt fracture in the present applicant's resins under his operating conditions is a function, primarily of exceeding a critical shear stress.

U.S. Pat. No. 3,382,535 discloses a means for designing dies which are to be used for the high speed extrusion coating of wire and cable with plastic materials such as polypropylene, high density and low density polyethylene together with their copolymers, which are responsive, or sensitive, to the taper angles of the extrusion die. The dies of this patent are designed to avoid gross melt fracture of the extruded plastic wire coating which is encountered at significantly higher stresses than that for surface melt fracture encountered during film formation.

The invention of U.S. Pat. No. 3,382,535 resides in the designing of the taper angle of the die entry so as to provide a curvilinear die configuration (FIGS. 6 and 7 of the patent) which converges in the direction of flow of the resin. This procedure however, of, in effect, decreasing the taper angle of the die, will result in an increase in the critical shear rate of the resin processed through the die. This reduces gross distortions as a function only of the angle of entry in and/or to the die. Surface melt fracture is insensitive to taper angles at the die entry and the present invention relates to reducing surface melt fracture as a function of the materials of construction of the die land region including the die exit whereby significantly higher shear rates can be obtained without encountering surface melt fracture during film fabrication.

U.S. Pat. No. 3,879,507 discloses a means of reducing melt fracture during the extrusion of foamable composition into film or sheet. This method involves increasing the length of the die land and/or slightly tapering the die gap, while retaining or decreasing the die gap, which is apparently to be relatively narrow, as compared to the prior art (see column 4, lines 2–6) and of the order of 0.025 inches or 25 mils (column 5, line 10). This kind of melt fracture is produced by premature bubble formation at the surface. This melt fracture, however, is totally different than the melt fracture experienced in processing LLDPE resins for film formation. In other words, the melt fracture is not as a result of rheological properties as discussed herein. Die modifications are designed to reduce the shear stress in the die land region to be below the critical stress level (approximately 20 psi) by either enlarging the die gap (U.S. Pat. Nos. 4,243,619 and 4,282,177) or heating the die lip to temperatures significantly above the melt temperature. Enlarging the die gap results in thick extrudates which must be drawn down and cooled in the film blowing process. While LLDPE resins have excellent drawdown characteristics, thick extrudates increase the molecular orientation in the machine direction and results in directional imbalance and reduction in critical film properties such as tear resistance. Also, thick extrudates limit the efficiency of conventional bubble cooling systems which result in reduced rates for stable operation. The wide gap technology has other disadvantages. The required gap is a function of extrusion rate, resin melt index and melt temperature. The wide gap configuration is not suitable for processing conventional Low Density Polyethylene (HP-LDPE) resins. Thus, die gap changes are required to accommodate the flexibility expected by the fabricator with a given line.

The heated lip concept is aimed at reducing stresses at the die exit and involves extensive modifications requiring efficient insulation of the hot lips from the rest of the die and from the air ring.

U.S. Pat. No. 3,125,547 discloses a polyolefin composition involving the addition of a fluorocarbon polymer to provide improved extrusion characteristics and melt fracture free extrudates at high extrusion speeds. This is based on the inventor's conclusion that the slip-stick phenomenon at high extrusion speeds and the resulting herring bone pattern on the extrudate surface are due to poor lubrication at the die orifice. The use of the fluorocarbon polymer is intended to promote lubrication and reduce the stresses involved to obtain melt fracture free extrudates. The present invention, however, is based on an exactly opposite reasoning in that, it is the lack of adhesion, rather than lack of lubrication, at the polymer/metal interface in the die land region as the cause of both surface and gross metal fracture in LLDPE resins. The present invention, thus aims at improving the adhesion at the interface by proper choice of the material of construction of the die land region, including the die exit, to achieve melt fracture free extrudates. The practice of U.S. Pat. No. 3,125,547 drastically reduces the stresses with dies constructed from conventional materials which, apparently suggests a modification of the rheological properties of the polyolefin resin due to the presence of the fluorocarbon polymer. The process of the present invention, involving a different material of construction for the die land region, achieves melt fracture free extrudates without significantly affecting the stresses involved or the rheological properties of the resin.

U.S. Pat. No. 4,342,848 discloses the use of Polyvinyloctadecyl Ether as a processing modifier to obtain smoother surface of the extrudates and improved film properties with high density polyetheylene resins. This additive, however, was found to be unsuitable for melt fracture reductions with LLDPE resins.

Additives for use as processing aids to obtain melt fracture reduction in extrudates, are expensive and the added cost, depending on the required concentration, may be prohibitive in resins, such as granular LLDPE, intended for commodity applications. Additives influence the rheological properties of the base resin and, in excess amounts, may adversely affect critical film properties including gloss, transparency, blocking and heat sealability characteristics of the product.

In the process of the present invention, surface melt fracture, can be virtually eliminated by changes in the die i.e., by extruding the narrow molecular weight distribution ethylene polymer at normal film extrusion temperatures through a die having a die land region defining opposing die exit surfaces and wherein at least one, and preferably both of the opposing die exit surfaces are fabricated from an alloy containing 5 to 95 parts by weight zinc and 95 to 5 parts by weight of copper to provide at least one and preferably two zinc/copper alloy surfaces in contact with the molten polymer. The utility of the present invention arises as a result of the discovery that the primary mechanism for the onset of surface melt fracture in LLDPE resins is the initiation of slip of polymer melt at the die wall. Slip is due to the breakdown of adhesion at the polymer/metal interface under flowing conditions and occurs at a critical shear stress. Adhesion is a surface phenomenon being strongly dependent on the nature of surfaces and the intimacy of contact of surfaces. Thus, techniques to provide good adhesion at the flowing polymer/die wall interface will result in the elimination of surface melt fracture for LLDPE resins. Improvements in adhesion can be achieved by either proper choice of materials of construction of the die for a given resin or use of adhesion promoters in the resin for a given material or a proper combination of both. In the present invention, it has been found that use of a zinc/copper alloy surface for the die land region eliminates surface melt fracture during film fabrication of LLDPE resins with narrow die gaps at commercial rates.

In the case where only one surface of the opposing die land surfaces is constructed from the zinc/copper alloy, then surface melt fracture is reduced or eliminated on the surface of the polymer adjacent to the zinc/copper alloy. If both surfaces of the opposing die land are constructed from the alloy, then both surfaces of the polymer would have reduced melt fracture.

Films suitable for packaging applications must possess a balance of key properties for broad end-use utility and wide commercial acceptance. These properties include film optical quality, for example, haze, gloss, and see-through characteristics. Mechanical strength properties such as puncture resistance, tensile strength, impact strength, stiffness, and tear resistance are important. Vapor transmission and gas permeability characteristics are important considerations in perishable goods packaging. Performance in film converting and packaging equipment is influenced by film properties such as coefficient of friction, blocking, heat sealability and flex resistance. Low density polyethylene has a wide range of utility such as in food packaging and non-food packaging applications. Bags commonly produced from low density polyethylene include shipping sacks, textile bags, laundry and dry cleaning bags and trash bags. Low density polyethylene film can be used as drum liners for a number of liquid and solid chemicals and as protective wrap inside wooden crates. Low density polyethylene film can be used in a variety of agricultural and horticultural applications such as protecting plants and crops, as mulching, for storing of fruits and vegetables. Additionally, low density polyethylene film can be used in building applications such as a moisture or moisture vapor barrier. Further, low density polyethylene film can be coated and printed for use in newspapers, books, etc.

Possessing a unique combination of the aforedescribed properties, high pressure low density polyethylene is the most important of the thermoplastic packaging films. It accounts for about 50% of the total usage of such films in packaging. Films made from the polymers of the present invention, preferably the ethylene hydrocarbon copolymers, offer an improved combination of end-use properties and are especially suited for many of the applications already served by high pressure low density polyethylene.

An improvement in any one of the properties of a film such as elimination or reduction of surface melt fracture or an improvement in the extrusion characteristics of the resin or an improvement in the film extrusion process itself is of the utmost importance regarding the acceptance of the film as a substitute for high pressure low density polyethylene in many end use applications.

DRAWINGS

SUMMARY OF THE INVENTION

Figure 1:
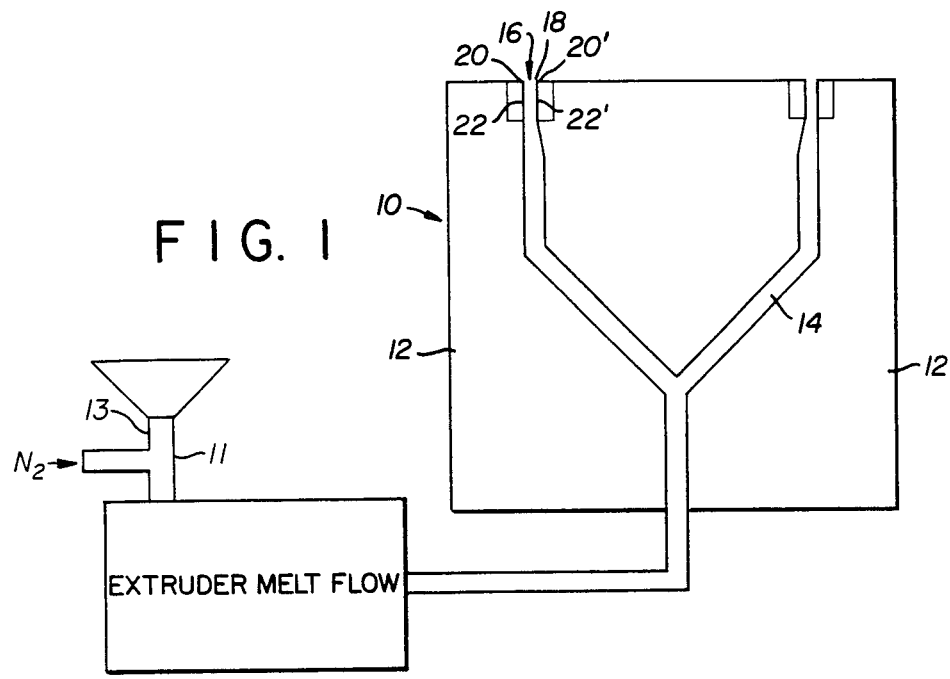
FIG. 1 shows a cross section of a spiral/spider annulus die.

In accordance with the present invention, there is provided a process for substantially eliminating surface melt fracture during extrusion of a molten narrow molecular weight distribution, linear, ethylene copolymer, under conditions of flow rate and melt temperature which would otherwise produce such surface melt fracture which comprises extruding said polymer through a die having a die land region defining opposing surfaces, and wherein at least one of said opposing surface is fabricated from an alloy containing 5 to 95 parts by weight zinc and 95 to 5 parts by weight of copper whereby melt fracture is substantially eliminated on the surface of the polymer adjacent to said zinc/copper containing alloy surface.

Preferably both opposing surfaces contain the zinc/copper alloy adjacent the polymer.

In a broader aspect of the invention, it has now been determined that in addition to the ethylene polymers recited therein, that the practice of the present invention is also applicable to thermoplastic polymers which experience surface melt fracture during extrusion at flow rates and melt temperatures which produce such melt fracture. Examples of thermoplastic materials in which surface melt fracture can be observed include polypropylene, polystyrene, styrene-butadiene-styrene, polyvinylchloride, polyacrylonitrile, and like polymers. Thus, in a broader aspect the present invention provides a process for substantially eliminating surface melt fracture during extrusion of a thermoplastic polymer under conditions of flow rate and melt temperature which would otherwise produce such melt fracture which comprises extruding said thermoplastic polymer through a die having a die land region defining opposing surfaces, and wherein at least one of said opposing surface is fabricated from an alloy containing 5 to 95 parts by weight zinc and 95 to 5 parts by weight of copper whereby melt fracture is substantially eliminated on the surface of the polymer adjacent to said zinc/copper containing alloy surface.

In addition in a preferred operative mode, it is desirable to minimize moisture content in the resin entering the extruder. This can be accomplished by hopper dryers, or use of an inert gas such as nitrogen in the hopper or preferably at the throat of the extruder or hopper.

The present invention also provides a die for extruding thermoplastic polymers prone to melt fracture which comprises a die block, having inlet means for introducing an extruder melt into said die block and outlet means for discharging molten polymer from said die block, conduit means for passing molten material from said inlet means to said outlet means said outlet means including a land entry section and a die land, said die land having surfaces in contact with said molten polymer, at least one of said surfaces being fabricated from an alloy containing 5 to 95 parts by weight zinc and 95 to 5 parts by weight of copper whereby melt fracture is substantially eliminated on the surfaces of the polymer adjacent to said zinc/copper containing alloy surface.

DESCRIPTION OF THE PREFERRED EMBODIMENT

Dies

Advantageously, the molten ethylene polymer can be extruded through a die such as a spiral annular die, slit die, etc., preferably an annular die, having a narrow die gap up to about 50 mils and preferably about 5-40 mils. Advantageously, when processing LLDPE resins, it is no longer required to extrude the molten ethylene polymer through a die having a die gap of greater than about 50 mils to less than about 120 mils, as described in U.S. Pat. No. 4,243,619. Conventionally, die land region construction has been largely based on nickel or chrome plated steel surfaces.

FIG. 1 is a cross-sectional view of a spiral/spider annular die 10 through which the molten thermoplastic ethylene polymer is extruded to form a single layer film, tube or pipe. The solid thermoplastic polymer e.g., ethylene polymer is introduced into the extruder from hopper 11 together with an inert fluid introduced at the throat of the extruder 13 and intended to provide a dry atmosphere. The preferred fluid is nitrogen gas at a rate of about 1 to 3 standard cubic feet per hour. Die block 12 contains channels 14 for directing the polymer to the die exit. As the molten thermoplastic ethylene polymer is extruded, its spreads out as it passes into the die channels 14.

Figure 2:
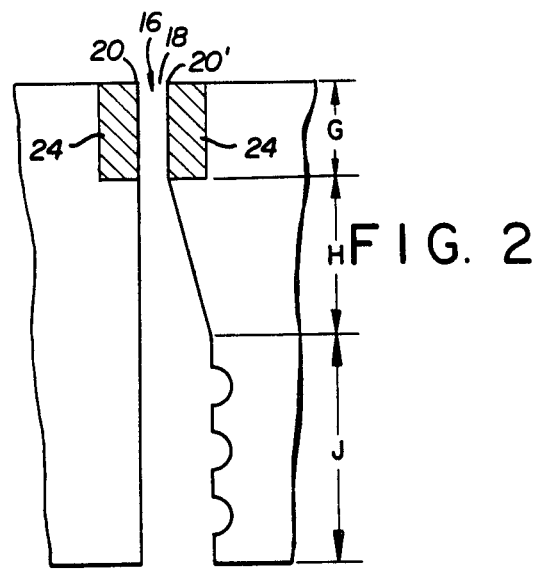
FIG. 2 shows an enlarged cross section of a portion of a spiral die.

Referring to FIG. 2, which is a cross-section of a spiral die, there is indicated a spiral section J land entry section H and die land G. With reference to FIGS. 1 and 2, at the exit of the die, there is a die discharge outlet identified generally by reference numeral 16. The discharge outlet defines an exit die gap 18 which is formed by opposing surfaces of die lips 20 and 20' extending from opposing die land surfaces 22 and 22'.

Figure 3:
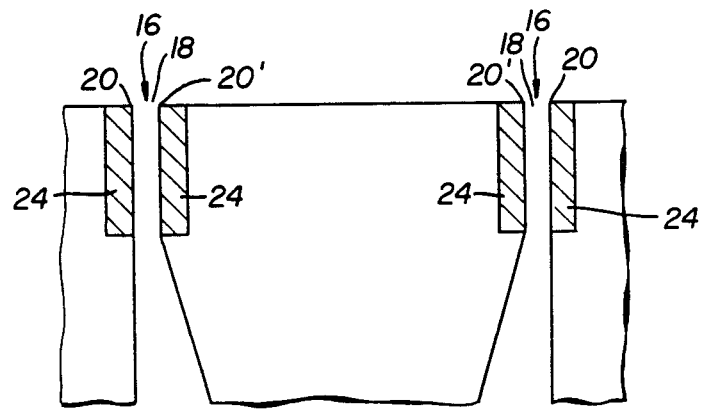
FIG. 3 shows a configuration of the die land region wherein the opposing zinc/copper alloy surfaces are provided by zinc/copper alloy inserts.
Figure 4:
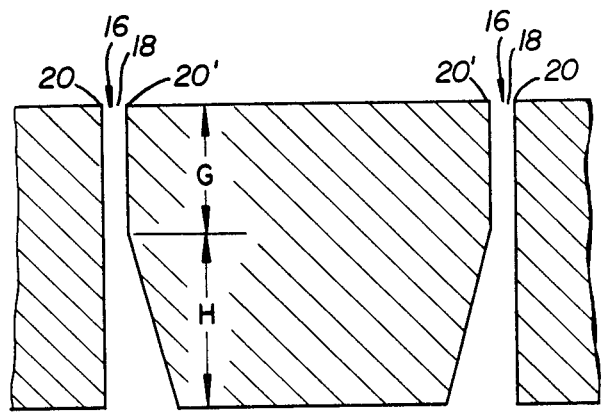
FIG. 4 shows a configuration of the die land region wherein the opposing zinc/copper alloy surfaces are provided by solid zinc/copper alloy construction of the zinc/copper alloy collar and zinc/copper alloy pin.

As shown in FIGS. 3 and 4, the die land region shows a configuration wherein opposing surfaces are fabricated from an alloy containing zinc/copper material as contrasted to conventional nickel or chrome plated steel. The surfaces can be provided by inserts 24 which are secured, preferably detachably secured to the pin and the collar. The inserts can be detachably secured to the modified pin and collar by any suitable means such as by provision of threaded elements disposed interiorly of the inserts which threadably engage in a mating relationship threaded elements of the corresponding surface of the pin or collar. The length measured in the direction of extrudate flow, of the inserts are preferably the length of the die land region although shorter lengths are operable. Other techniques for providing the zinc/copper containing alloy surface can be utilized such as by coating the surfaces of the die land region with the alloy or alternatively by fabricating either the die land section or the entire pin and collar from the alloy as shown in FIG. 4.

The melt fracture is reduced on the surface of the polymer adjacent to the alloy surface. As a result, the process can be practiced with the invention disclosed in U.S. Pat. No. 4,348,349 issued on Sept. 7, 1982. Advantageously, therefore, melt fracture can be reduced on both sides of a film by directing the molten polymer through the die land region wherein only the surface of film in which melt fracture is to be reduced or eliminated is adjacent to the zinc/copper alloy surface and on the other surface melt fracture would also be eliminated as disclosed in the patent. Also, according to the present invention, processing of multi-layer films is also possible wherein one layer is formed of LLDPE and another layer is formed from a resin which under the conditions of operation is not subject to melt fracture. Thus, by the process of the instant invention, the LLDPE resin can be passed through the die in contact with the zinc alloy surface whereas the resin not subject to melt fracture is extruded in contact with the other die land surface thereby producing a multi-layer film, both outer surfaces of which would be free of melt fracture.

As mentioned previously, the surface of the die land region adjacent to the molten polymer is constructed from an alloy containing zinc and copper. Various other types of metal surfaces are examined in an attempt to reduce/eliminate surface melt fracture. These surfaces included: conventional chrome plated steel; titanium nitride plated steel; pure copper; pure zinc; Berryllium copper; carbon steel (4140); and, nickel steel (4340). The detailed extrudate surface characteristics at comparable film fabrication conditions were found to be different with each of the above surfaces but none were found to be effective in reducing surface melt fracture to commercially acceptable levels.

The zinc/copper containing alloy was found to be particularly suitable when used in amounts containing 5 to 95 parts by weight zinc and 95 to 5 parts by weight of copper.

Preferred amounts are 30 to 40 parts by weight zinc and 70 to 60 parts by weight copper. Superior results are obtained when the zinc/copper containing alloy commercially available as naval brass or free-cutting brass, is utilized. The zinc/copper containing alloy can contain other elements such as tin, aluminum, lead etc.

With brass surfaces for the die land region, surface melt fracture appears initially during startup which it is believed is due to the presence of absorbed oxide film. Following a brief induction period, which depends on the rate of extrusion, the extrudate becomes free of surface melt fracture and remains so for an interval depending on the extrusion rate. Surface melt fracture reappears after this interval. This is believed to be due to the degradation of the brass surface as a result of dezincification of brass, at temperatures employed for processing LLDPE resins, thus affecting the adhesion characteristics at the polymer/brass interface. It has been found that the use of a suitable stabilizing additive in the resin eliminates this time dependency with brass surfaces. Thus, for prolonged operation it is preferred that a suitable stabilizing additive be used which can be included in the masterbatch added to the copolymer. A suitable stabilizing additive for use with brass is fatty diethoxylated tertiary amine, commercially available as Kemamine AS 990 from Witco Chemical Corporation, Memphis, Tenn. Other conventional stabilizing additives can also be utilized. Addition of 50–1500 ppm, but preferably in the range of 300–800 ppm, of the tertiary amine is effective in eliminating the recurrence of melt fracture with brass. This stabilizer can be included in the Masterbatches conventionally used for providing required antiblock and slip characteristics for the product.

Film Extrusion

I. Blown Film Extrusion

The films formed as disclosed herein may be extruded by tubular blown film extrusion process. In this process a narrow molecular weight distribution polymer is melt extruded through an extruder. This extruder may have an extrusion screw therein with a length to diameter ratio of between 15:1 to 21:1, as described in U.S. Pat. No. 4,343,755 in the names of John C. Miller et al and entitled "A Process For Extruding Ethylene Polymers". This application describes that this extrusion screw contains a feed, transition and metering section. Optionally, the extrusion screw can contain a mixing section such as that described in U.S. Pat. Nos. 3,486,192; 3,730,492 and 3,756,574, which are incorporated herein by reference. Preferably, the mixing section is placed at the screw tip.

The extruder which may be used herein may have a 18:1 to 32:1 length to internal diameter barrel ratio. The extrusion screw used in the present invention may have a length to diameter ratio of 15:1 to 32:1. When, for example, an extrusion screw of a length to diameter ratio of 18:1 is used in a 24:1 extruder, the remaining space in the extrusion barrel can be partially filled with various types of plugs, torpedoes, or static mixers to reduce residence time of the polymer melt.

The extrusion screw can also be of the type described in U.S. Pat. No. 4,329,313. The molten polymer is then extruded through a die, as will hereinafter be described.

The polymer is extruded at a temperature of about 163° C. to about 260° C. The polymer is extruded in an upward vertical direction in the form of a tube although it can be extruded downward or even sideways. After extrusion of the molten polymer through the annular die, the tubular film is expanded to the desired extent, cooled, or allowed to cool and flattened. The tubular film is flattened by passing the film through a collapsing frame and a set of nip rolls. These nip rolls are driven, thereby providing means for withdrawing the tubular film away from the annular die.

A positive pressure of gas, for example, air or nitrogen, is maintained inside the tubular bubble. As is known in the operation of conventional film processes, the pressure of the gas is controlled to give the desired degree of expansion to the tubular film. The degree of expansion, as measured by the ratio of the fully expanded tube circumference to the circumference of the die annulus, is in the range 1:1 to 6:1 and preferably, 1:1 to 4:1. The tubular extrudate is cooled by conventional techniques such as, by air cooling, water quench or mandrel.

The drawdown characteristics of the polymers disclosed herein are excellent. Drawdown, defined as the ratio of the die gap to the product of film gauge and blow up ratio, is kept less than about 250. Very thin gauge films can be produced at high drawdown from these polymers even when said polymer is highly contaminated with foreign particles and/or gel. Thin gauge films of about 0.5 to 3.0 mils can be processed to exhibit ultimate elongations MD greater than about 400% to about 700% and TD greater than about 500% to about 700%. Furthermore, these films are not perceived as "splitty". "Splittiness" is a qualitative term which describes the notched tear response of a film at high deformation rates. "Splittiness" reflects crack propagation rate. It is an end-use characteristic of certain types of film and is not well understood from a fundamental perspective.

As the polymer exits the annular die, the extrudate cools and its temperature falls below its melting point and it solidifies. The optical properties of the extrudate change as crystallization occurs and a frost line is formed. The position of this frost line above the annular die is a measure of the cooling rate of the film. This cooling rate has a very marked effect on the optical properties of the film produced herein.

The ethylene polymer can also be extruded in the shape of a rod or other solid cross section using the same die geometry for only the external surface. Additionally, the ethylene polymer can also be extruded into pipe through annular dies.

II. Slot Cast Film Extrusion

The films formed as disclosed herein may also be extruded by slot cast film extrusion. This film extrusion method is well known in the art and comprises extruding a sheet of molten polymer through a slot die and then quenching the extrudate using, for example, a chilled casting roll or water bath. The die will hereinafter be described. In the chill roll process, film may be extruded horizontally and laid on top of the chill roll or it may be extruded downward and drawn under the chill roll. Extrudate cooling rates in the slot cast process are very high. Chill roll of water bath quenching is so fast that as the extrudate cools below its melting point, crystallites nucleate very rapidly, supramolecular structures have little time to grow and spherulites are held to a very small size. The optical properties of slot cast film are vastly improved over those characterizing films using the slower cooling rate, tubular blown film extrusion process. Compound temperatures in the slot cast film extrusion process generally run much higher than those typifying the tubular blown film process. Melt strength is not a process limitation in this film extrusion method. Both shear viscosity and extensional viscosity are lowered. Film can generally be extruded at higher output rates than practiced in the blown film process.

The higher temperatures reduce shear stresses in the die and raise the output threshold for surface melt fracture.

Film

The film produced by the method of the present invention has a thickness of greater than about 0.10 mils to about 20 mils, preferably greater than about 0.10 to 10 mils, most preferably greater than about 0.10 to 4.0 mils. The 0.10 to 4.0 mil film is characterized by the following properties: a puncture resistance value of greater than about 7.0 in-lbs/mil; an ultimate elongation of greater than about 400%, tensile impact strength of greater than about 500 to about 2000 ft-lbs/in$^3$ and tensile strength greater than about 2000 to about 7000 psi.

Various conventional additives such as slip agents, antiblocking agents, and antioxidants can be incorporated in the film in accordance with conventional practice.

The Ethylene Polymers

The polymers which may be used in the process of the present invention are homopolymers of ethylene or copolymers of a major mol percent (greater than or equal to 80%) of ethylene, and a minor mol percent (less than or equal to 20%) of one or more $C_3$ to $C_8$ alpha olefins. The $C_3$ to $C_8$ alpha olefins should not contain any branching on any of their carbon atoms which is closer than the fourth carbon atom. The preferred $C_3$ to $C_8$ alpha olefins are propylene, butene-1, pentene-1, hexene-1, 4-methylpentene-1 and octene-1.

The ethylene polymers have a melt flow ratio of about greater than or equal to 18 to less than or equal to 50, and preferably of about greater than or equal to 22 to less than or equal to 30.

The homopolymers have a density of about greater than or equal to 0.958 to less than or equal to 0.972 and preferably of about greater than or equal to 0.961 to less than or equal to 0.968. The copolymers have a density of about greater than or equal to 0.89 to less than or equal to 0.96 and preferably greater than or equal to 0.917 to less than or equal to 0.955, and most preferably, of about greater than or equal to 0.917 to less than or equal to 0.935. The density of the copolymer, at a given melt index level for the copolymer, is primarily regulated by the amount of the $C_3$ to $C_8$ comonomer which is copolymerized with the ethylene. In the absence of the comonomer, the ethylene would homopolymerize with the catalyst of the present invention to provide homopolymers having a density of about greater than or equal to 0.96. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions.

When made in the fluid bed process, polymers of the present invention are granular materials which have a settled bulk density of about 15 to 32 pounds per cubic foot and an average particle size of the order of about 0.005 to about 0.06 inches.

For the purposes of making film in the process of the present invention, the preferred polymers are the copolymers and particularly those copolymers having a density of about greater than or equal to 0.917 to less than or equal to 0.924; and a standard melt index of greater than or equal to 0.1 to less than or equal to 5.0.

The Propylene Polymers

The propylene polymers which can be used in the process of the present invention, span a melt flow range (measured according to ASTM-1238 Condition L) from about 0.1 to 100 g/10 min. and are from among polypropylene homopolymers with an isotatic index (insoluble with reflux in heptane over a 24 hour period) greater than or equal to 85%, random copolymers with a total major molar percent of greater than or equal to 85% of propylene and a minor molar percent of less than or equal to 15% of ethylene and/or one or more of $C_3$ to $C_8$ alpha olefins and block (or impact copolymers) with a total major weight percent from about 70 to about 95% of propylene and a minor weight percent from about 5 to about 30% of ethylene and/or one or more of $C_3$ to $C_8$ alpha olefins.

The process of the present invention is also applicable to extrusion of thermoplastic resins for other than film making purposes. Thus in addition to reduction or elimination of surface melt fracture from films, the process can also be used to reduce or eliminate surface melt fracture in thin wall tubes, pipes etc. which would otherwise be susceptible to surface melt fracture under conventional surface melt fracture conditions.

The films made in the process of the present invention have a thickness of greater than 0.1 mil to less than or equal to 10 mils and preferably of greater than 0.1 mil to less than or equal to 5 mils.

Having set forth the general nature of the invention, the following examples illustrate some specific embodiments of the invention. It is to be understood, however, that this invention is not limited to the examples, since the invention may be practiced by the use of various modifications.

EXAMPLE 1

This Example demonstrates a conventional procedure (except for the nitrogen purge in the hopper) for extruding ethylene polymers into tubes.

An ethylene-butene copolymer was prepared in accordance with the procedure of U.S. Pat. No. 4,302,566 and which is available from Union Carbide Corporation under the Trademark designation Bakelite GRSN 7047. The copolymer was dry blended with 4% of a conventional masterbatch containing conventional antiblock agent, slip agent and antioxidants and also included 320 ppm by weight of Kemamine AS 990. The copolymer had a nominal density of 0.918 gm/cc, a nominal melt index of 1.0 decigrams/min., and a nominal melt flow ratio of 26. The copolymer was formed into a tube by passing the resin from a hopper which was purged with nitrogen at 3 standard cubic feet per hour through a conventional 2½ inch diameter screw extruder having a polyethylene screw as described in U.S. Pat. No. 4,329,313 with a Maddock mixing section, and thence into a conventional chrome plated die having a 0.5 inch land, 3 inch die collar diameter and a die pin diameter normally of 2.92 inches to give a 40 mil. die gap. The sides of the die land were parallel with the flow axis of the polymer melt. The resin was extruded through the die at a rate of 66 lbs/hr at a temperature of 221° C. There was severe surface melt fracture observed on both surfaces of the tube.

EXAMPLE 2

This Example demonstrates a conventional procedure for extruding a different type of ethylene polymer into tubes.

The ethylene-butene copolymer was prepared in accordance with the procedures of U.S. Pat. No. 4,302,566 and which is available from Union Carbide Corporation under the Trademark designation Bakelite GERS-6937. The copolymer also contained 4% of the masterbatch, as in Example 1. The copolymer has a nominal density of 0.918 gm/cc, a nominal melt index of 0.5 decigrams/minute and a nominal melt flow ratio of 26. The copolymer was formed into a tube by passing the resin after drying with nitrogen through the conventional 2½ inch diameter extruder and mixer of Example 1 and into the die of Example 1. The resin was extruded through the die at a rate of 68 lbs/hr and at a temperature of 229° C. There was severe surface melt fracture observed on both surfaces of the tube.

EXAMPLE 32

This Example demonstrates a conventional procedure for extruding another ethylene polymer into tubes.

An ethylene-butene-hexene terpolymer was prepared in accordance with the procedure of U.S. Pat. No. 4,302,566 and which is produced by Union Carbide Corporation under the designation DEX-7652. The copolymer also contained 4% of the masterbatch, as in Example 1. The copolymer had a nominal density of 0.918 gm/cc, a nominal melt index of 1.0 decigrams/minute and a nominal melt flow ratio of 26. The copolymer was formed into a tube by passing the resin after drying with nitrogen through a conventional 2½ inch diameter extruder and mixer of Example 1 and into the die of Example 1. The resin was extruded through the die at a rate of 68 lbs/hr and at a temperature of 220° C. There was severe surface melt fracture observed on both surfaces of the tube.

EXAMPLE 4

This Example demonstrates a conventional procedure for extruding another ethylene polymer into tubes.

An ethylene-butene-hexene terpolymer was prepared in accordance with the procedure of U.S. Pat. No. 4,302,566 and which is produced by Union Carbide Corporation under designation DEX-7653. The copolymer also contained 4% of the masterbatch, as in Example 1. The copolymer had a nominal density of 0.918 gm/cc, a nominal melt index of 0.5 decigrams/minute and a nominal melt flow ratio of 26. The copolymer was formed into a tube by passing the resin after drying with nitrogen through a conventional 2½ inch diameter extruder and mixer of Example 1 and into the die of Example 1. The resin was extruded through the die at a rate of 68 lbs/hr and at a temperature of 229° C. There was severe surface melt fracture observed on both surfaces of the tube.

EXAMPLE 5

This Example demonstrates the improved reesults obtained over Example 1 by the use of free cutting Brass die pin and collar nominally containing 35% Zinc, 61.5% Copper, 3% lead and 0.5% iron.

The ethylene-butene copolymer was identical to Example 1 and contained the masterbatch. The copolymer was formed into a tube by passing the resin after drying with nitrogen fed at a rate of 3 standard cubic feet per hour through the conventional 2½ inch diameter extruder and mixer of Example 1 and into the die of Example 1 except for the brass surface of the die land. The resin was extruded through the die at a rate of 66 lbs/hr and at a temperature of 220° C. Other than during the initial start-up (induction period) there was no surface melt fracture on either surface of the tube.

EXAMPLE 6

This Example demonstrates the improved results obtained over Example 2 by the use of free cutting Brass die pin and collar nominally containing 35% Zinc, 61.5% Copper, 3% lead and 0.5% iron.

The ethylene-butene copolymer was identical to Example 2 and contained the masterbatch. The copolymer was formed into a tube by passing the resin after drying with nitrogen through the conventional 2½ inch diameter extruder and mixer of Example 1 and into the die of Example 1 except for the brass surface of the die land. The resin was extruded through the die at a rate of 68 lbs/hr and at a temperature of 229° C. Other than during the initial start-up (induction period) there was no surface melt fracture on either surface of the tube.

EXAMPLE 7

This Example demonstrates the improved results obtained over Example 3 by the use of free cutting Brass die pin and collar nominally containing 35% Zinc, 61.5% Copper, 3% lead and 0.5% iron.

The ethylene-butene-hexene terpolymer was identical to Example 3 and contained the masterbatch. The terpolymer was formed into a tube by passing the resin after drying with nitrogen through the conventional 2½ inch diameter extruder and mixer of Example 1 and into the die of Example 1 except for the brass surface of the die land. The resin was extruded through the die at a rate of 68 lbs/hr and at a temperature of 220° C. Other than during the initial start-up (induction period) there was no surface melt fracture on either surface of the tube.

EXAMPLE 8

This Example demonstrates the improved results obtained over Example 4 by the use of free cutting Brass die pin and collar nominally containing 35% Zinc, 61.5% Copper, 3% lead and 0.5% iron.

The ethylene-butene-hexene terpolymer was identical to Example 4 and contained the masterbatch. The terpolymer was formed into a tube by passing the resin after drying with nitrogen through the conventional 2½ inch diameter extruder and mixer of Example 1 and into the die of Example 1 except for the brass surface of the die land. The resin was extruded through the die at a rate of 68 lbs/hr and at a temperature of 229° C. Other than during the initial start-up (induction period) there was no surface melt fracture on either surface of the tube.

EXAMPLE 9

This Example demonstrates the improved results over Example 1 by the use of free cutting Brass die pin and collar nominally containing 35% Zinc, 61.5% Copper, 3% lead and 0.5% iron and a decreased die gap of 20 mil.

The ethylene-butene copolymer was identical to Example 1 and contained the masterbatch. The copolymer was formed into a tube by passing the resin after drying with nitrogen through the conventional 2½ inch diameter meter extruder and mixer of Example 1 and into a die having a die gap of 20 mils. Other features of the die are as in Example 1. The sides of the die land were parallel with the flow axis of the polymer melt. The resin was extruded at a rate of 66 lbs/hr and at a temperature of 220° C. Following the induction period, there was no surface melt fracture observed on either surface of the tube.

EXAMPLE 10

This Example demonstrates the improved results over Example 2 by the use of free cutting Brass die pin and collar nominally containing 35% Zinc, 61.5% Copper, 3% lead and 0.5% iron and a decreased die gap of 20 mil.

The ethylene-butene copolymer was identical to Example 2 and contained the masterbatch. The copolymer was formed into a tube by passing the resin after drying with nitrogen through the conventional 2½ inch diameter meter extruder and mixer of Example 1 and into a die having a die gap of 20 mils. Other features of the die are as in Example 1. The sides of the die land were parallel with the flow axis of the polymer melt. The resin was extruded at a rate of 68 lbs/hr and at a temperature of 229° C. Following the induction period, there was no surface melt fracture observed on either surface of the tube.

EXAMPLE 11

This Example demonstrates the improved results over Example 3 by the use of free cutting Brass die pin and collar nominally containing 35% Zinc, 61.5% Copper, 3% lead and 0.5% iron and a decreased die gap of 20 mil.

The ethylene-butene-hexene terpolymer was identical to Example 3 and contained the masterbatch. The terpolymer was formed into a tube by passing the resin after drying with nitrogen through the conventional 2½ inch diameter meter extruder and mixer of Example 1 and into a die having a die gap of 20 mils. Other features of the die are as in Example 1. The sides of the die land were parallel with the flow axis of the polymer melt. The resin was extruded at a rate of 68 lbs/hr and at a temperature of 220° C. Following the induction period, there was no surface melt fracture observed on either surface of the tube.

EXAMPLE 12

This Example demonstrates the improved results obtained over Example 4 by the use of free cutting Brass die pin and collar nominally containing 35% Zinc, 61.5% Copper, 3% lead and 0.5% iron. The ethylene-butene-hexene terpolymer was identical to Example 4 and contained the masterbatch. The terpolymer was formed into a tube by passing the resin after drying with nitrogen through the conventional 2½ inch diameter extruder and mixer of Example 1 and into a die having a die gap of 20 mils. The resin was extruded through the die at a rate of 68 lbs/hr and at a temperature of 229° C. Following the induction period, there was no surface melt fracture on either surface of the tube.

EXAMPLE 13

This Example demonstrates the improved results over Example 1 by the use of free cutting Brass die pin and collar containing 35% Zinc, 61.5% Copper, 3% lead and 0.5% iron and a reduced die gap of 10 mil.

The ethylene-butene copolymer was identical to Example 1 and contained the masterbatch. The copolymer was formed into a tube by passing the resin after drying with nitrogen through the conventional 2½ inch diameter extruder and mixer of Example 1 and into a die having a die gap of 10 mils and a 0.125 inch land length. The sides of the die land were parallel with the flow axis of the polymer melt. The resin was extruded at a rate of 66 lbs/hr and at a temperature of 221° C. Following the induction period, there was no surface melt fracture observed on either surface of the tube.

EXAMPLE 14

This Example demonstrates the improved results over Example 1 by the use of free cutting Brass die pin and collar nominally containing 35% Zinc, 61.5% Copper, 3% lead and 0.5% iron and a reduced die gap of 10 mil.

The ethylene-butene copolymer was identical to Example 1 and *contained no masterbatch or the stabilizing agent* (*Kemamine AS*990). The copolymer was formed into a tube by passing the resin after drying with nitrogen through the conventional 2½ inch diameter extruder and mixer of Example 1 and into a die having a die gap of 10 mils and a 0.125 inch land length. The sides of the die land were parallel with the flow axis of the polymer melt. The resin was extruded at a rate of 66 lbs/hr and at a temperature of 222° C. There was no induction period and there was no surface melt fracture observed on either surface of the tube.

EXAMPLE 15

This Example demonstrates the results for a different ethylene-butene copolymer by the use of free cutting Brass die pin and collar nominally containing 35% Zinc, 61.5% Copper, 3% lead and 0.5% iron.

The ethylene-butene copolymer was prepared in accordance with the procedure of U. S. Pat. No. 4,302,566 and which is produced by Union Carbide Corporation under the designation Bakelite GRSN-7081. The copolymer is fully formulated with conventional antiblock agent, slip agent, and antioxidants and also contained 320 ppm by weight of Kemamine AS 990. No additional masterbatch was used. The copolymer had a nominal density of 0.918 density, a nominal melt index of 1.0. decigrams/minute and a nominal melt flow ratio of 26. The copolymer was formed into a tube by passing the resin after drying with nitrogen through a conventional 2½ inch diameter extruder and mixer of Example 1 and into a die having a die gap of 20 mils as in Example 9. The resin was extruded at a rate of 91 lbs/hr and at a temperature of 222° C. Following the brief induction period, there was no surface melt fracture observed on either surface of the tube.

EXAMPLE 16

This Example demonstrates the results for another ethylene copolymer by the use of free cutting Brass die pin and collar nominally containing 35% Zinc, 61.5% Copper, 3% lead and 0.5% iron. This resin exhibits severe sharkskin melt fracture when extruded through the conventional die of Example 1.

An ethylene-butene copolymer was prepared in accordance with the procedure of U.S. Pat. No. 4,302,566 and which is produced by Union Carbide Corporation under the designation Bakelite GRSN-7071. The copolymer also contained 5% of a white concentrate in a masterbatch form identified as MB-1900 available from South West Plastics Company. In addition, 800 ppm by weight of Kemamine AS 990 was dry blended with the copolymer. The copolymer had a nominal density of 0.922 gm/cc, a nominal melt index of 0.7 decigrams/minute and a nominal melt flow ratio of 26. The resin was formed into a tube by passing the resin after drying with nitrogen through a conventional 2½ inch diameter extruder and mixer of Example 1 and into a die having a die gap of 10 mils and a 0.125 inch land length as in Example 13. The resin was extruded at a rate of 70 lbs/hr and at a temperature of 222° C. As before, there was no surface melt fracture observed on either surface of the tube.

EXAMPLE 17

This Examples demonstrates the results for yet another ethylene copolymer by the use of free cutting Brass die pin and collar nominally containing 35% Zinc, 61.5% Copper, 3% lead and 0.5% iron. This resin exhibits severe sharkskin melt fracture when extruded through the conventional die of Example 1.

An ethylene-hexene copolymer was prepared in accordance with the procedure of U.S. Pat. No. 4,302,566 and which is produced by Union Carbide Corporation under the designation Bakelite DEX-8218. The copolymer also contained 5% of a white concentrate in a masterbatch form identified as MB-1900 available from South West Plastics Company. In addition, 800 ppm by weight of Kemamine AS 990 was dry blended with the copolymer. The copolymer had a nominal density of 0.928 gm/cc, a nominal melt index of 0.9 decigrams/minute and a nominal melt flow ratio of 26. The resin was formed into a tube by passing the resin after drying with nitrogen through a conventional 2½ inch diameter extruder and mixer of Example 1 and into a die having a die gap of 10 mils and a 0.125 inch land length as in Example 13. The resin was extruded at a rate of 70 lbs/hr and at a temperature of 222° C. As before, there was no surface melt fracture observed on either surface of the tube.

EXAMPLE 18

This Example demonstrates the results with the offset configuration for the chrome plated die as disclosed in U.S. Pat. No. 4,348,349 wherein the surface melt fracture is reduced on the side of the tube in contact with the die lip having a positive offset.

The ethylene-butene copolymer was identical to Example 1 and contained no masterbatch. Instead, 800 ppm by weight of Kemamine AS 990 was dry blended with the copolymer. The copolymer was formed into a tube by passing the resin after drying with nitrogen through a conventional 2½ inch diameter extruder and mixer of Example 1 and into a conventional 3 inch diameter die having a die gap of 40 mils and a land length of 1.375 inches. The sides of the die land were parallel to the flow axis of the polymer melt except that the top surface of the die pin was 120 mils above that of the collar. The resin was extruded through the die at a rate of 66 lbs/hr and at a temperature of 221° C. As disclosed in the U.S. Pat. No. 4,348,349 severe surface melt fracture was observed on the outside of the tube with little or no surface melt fracture on the inside of the tube.

EXAMPLE 19

This Example demonstrates that results similar to the offset configuration for the die can be obtained without offsetting the die lip but by using free cutting Brass die pin nominally containing 35% Zinc, 61.5% Copper, 3% lead and 0.5% iron and a conventional chrome plated die collar.

The ethylene-butene copolymer was identical to Example 1 and contained no masterbatch. Instead, 800 ppm by weight of Kemamine AS 990 was dry blended with the copolymer. The copolymer was formed into a tube by passing the resin after drying with nitrogen through a conventional 2½ inch diameter extruder and mixer of Example 1 and into a die having a 40 mil die gap provided by a conventional die collar of 3 inch diameter and a brass die pin with a diameter of 2.92 inches. The die pin and the collar were level and had no offset as in Example 17. Other features of the die are as in Example 17. The sides of the die land were parallel to the flow axis of the polymer melt. The resin was extruded through the die at a rate of 66 lbs/hr and at a temperature of 221° C. Following a brief induction period, surface melt fracture was observed on the outside of the tube which was in contact with the conventional chrome plated die collar and no surface melt fracture on the inside of the tube which was adjacent to the brass surface.

EXAMPLE 20

This Example demonstrates the improved results over Example 18 by the use of free cutting Brass die pin nominally containing 35% Zinc, 61.5% Copper, 3% lead and 0.5% iron and a conventional chrome plated die collar with a positive offset.

The ethylene-butene copolymer was identical to Example 1 and contained no masterbatch. Instead, 800 ppm of the stabilizing agent (Kemamine AS 990) was dry blended with the copolymer. The copolymer was formed into a tube by passing the resin after drying with nitrogen through a conventional 2½ inch diameter extruder and mixer of Example 1 and into the die of Example 18 except for a 120 mil positive offset for the Collar. Other features of the die are as in Example 17. The sides of the die land were parallel to the flow axis of the polymer melt. The resin was extruded through the die at a rate of 67 lbs/hr and at a temperature of 221° C. Following a brief induction period, very little surface melt fracture was observed on either surface of the tube.

EXAMPLE 21

This example demonstrates the performance of Free Cutting Brass surfaces for the die land region without the use of Nitrogen purge at the throat of the extruder.

An ethylene-butene copolymer was prepared in accordance with the procedure of U.S. Pat. No. 4,302,566 and which is available from Union Carbide Corporation under the Trademark designation Bakelite GRSN-7087. The copolymer contained 5% of a masterbatch identified as DFDC-0073 available from Union Carbide Corporation. The masterbatch contained conventional antiblock agent, slip agent, antistatic agent (Kemamine AS 990) and anti-oxidants. The copolymer had a nominal density of 0.918 gm/cc, a nominal melt index of 1.0 decigrams/minute and a nominal melt flow ratio of 26. The copolymer was formed into a tube by passing the resin through a conventional 3½ inch diameter screw extruder having a polyethylene screw as described in U.S. Pat. No. 4,329,313 with a Maddock mixing section and thence into a die having a 0.8 inch land, 8 inches die collar and a die pin diameter of 7.92 inches to give a 40 mil die gap. The die collar and pin were constructed from Free Cutting Brass. The sides of the die land region were parallel with the flow axis of the polymer melt. The resin was extruded through the die at a rate of 229 lbs/hr and at a temperature of 220 deg. C. Surface melt fracture was substantially reduced although there were several fine bands of surface imperfections observed on both sides of the tube.

EXAMPLE 22

This example demonstrates the improved results over Example 21 by the use of Nitrogen at the throat of the extruder with the die having Free Cutting Brass surfaces for the mandrel extension region.

The ethylene-butene copolymer was identical to Example 21 and contained the masterbatch. The copolymer was formed into a tube using the extruder and the 8 inch die, having the Free Cutting Brass surfaces for the mandrel extension region, which were identical to those used in Example 21. Nitrogen gas, from a cylinder, was metered into the throat of the extruder at a flow rate of ∼3 standard cubic feet per hour. The resin was extruded at a rate of 229 lbs/hr and at a temperature of 220 deg. C. Following a brief induction period, there was no melt fracture on either surface of the tube.

EXAMPLE 23

This Example demonstrates the conditions under which melt fracture is encountered during blown film fabrication with Polypropylene Homopolymers using conventional blown film dies.

A homopolymer of Polypropylene with the following characteristics was obtained. The homopolymer had a nominal melt flow index of 1.5 and an Isotacticity index of 95.7. The homopolymer was formed into a tube by passing the resin through a conventional 2½ inch screw extruder having a polyethylene screw as described in U.S. Pat. No. 4,329,313 with a Maddock mixing section, and thence into a conventional hard chrome plated steel die havaing a 1.375 inch land, 3 inch die collar diameter and a die pin diameter normally of 2.92 inches to give a 40 mil die gap. A Nitrogen purge at the throat of the extruder was used with a nitrogen flow rate of ∼3 standard cubic feet per hour. The sides of the die land were parallel with the flow axis of the polymer melt. THe resin was extruded through the die at a rate of 33.6 lbs/hr. The melt temperature was 218 deg. C. and the entire die was maintained at a temperature of 207 deg. C. A 1.5 mil film was fabricated at these conditions. There was severe surface melt fracture observed on both sides of the film.

EXAMPLE 24

This example demonstrates the improved results over Example 23 by the use of Free Cutting brass die pin and collar under identical conditions.

The polypropylene homopolymer was identical to Example 23. The homopolymer was formed into a tube by passing the resin through the conventional 2½ inch diameter extruder and mixer, along with the nitrogen purge on the throat, of Example 23 and into the die of identical design of Example 23 except that the die collar and pin were constructed from Free Cutting brass. The resin was extruded through the die at a rate 34 lbs/hr. The melt temperature was 218 deg. C. and the entire die was maintained at a temperature of 204 deg. C. Following a brief induction period, there was no melt fracture observed on either surface of the tube.

EXAMPLE 25

This example demonstrates the conventional procedure (except for the nitrogen purge in the hopper) for extruding ethylene polymers into thin wall tubes.

An ethylene-butene copolymer was prepared in accordance with the procedure of U.S. Pat. No. 4,302,566 and which is available from Union Carbide Corporation under Trademark designation Bakelite GRSN-7081 which contained 400 ppm of Kemamine AS 990. The copolymer had a nominal density of 0.918 gm/cc, a nominal melt index of 1.0 decigrams/minute and a nominal melt flow ratio of 26. The copolymer was extruded horizontally to form a 1 inch tube with a wall thickness of 25 mils by passing the resin from a hopper which was purged with nitrogen at 3 standard cubic feet per hour, through a conventional 2½ inch diameter screw extruder having a polyethylene screw and thence into a conventional spider die having a 0.5 inch land, 1.25 inch collar diameter and a mandrel diameter normally of 1.225 inch diameter to give a 25 mil die gap. The sides of the die land region were parallel with the flow axis of the polymer melt. The resin was extruded through the die at a rate of 32.4 lbs/hr at a melt temperature at 216 deg. C. There was severe melt fracture observed on both surfaces of the tube.

EXAMPLE 26

This example demonstrates the conventional procedure (except for the nitrogen purge in the hopper) for extruding ethylene polymers into thin wall tubes.

An ethylene-butene copolymer was prepared in accordance with the procedure of U.S. Pat. No. 4,302,566 and which is available from Union Carbide Corporation under Trademark designation Bakelite GRSN-7075 which was dry blended with 500 ppm of Kemamine AS 990. The copolymer had a nominal density of 0.918 gm/cc. a nominal melt index of 0.5 decigrams/minute and a nominal melt flow ratio of 26. The copolymer was extruded horizontally to form a 1 inch tube with a wall thickness of 25 mils by passing the resin from a hopper which was purged with nitrogen at 3 standard cubic feet per hour, through a conventional 2½ inch diameter screw extruder having a polyethylene screw and thence into a conventional spider die having a 0.5 inch land and a 1.25 inch collar diameter and a mandrel diameter normally of 1.225 inch to give a 25 mil die gap. The sides of the die land region was parallel with the flow axis of the polymer melt. The resin was extruded through the die at a rate of 42.6 lbs/hr at a melt temperature of 217 deg. C. There was severe melt fracture observed in both surfaces of the tube.

EXAMPLE 27

This example demonstrates the improved results over Example 25 by the use of Free Cutting Brass die collar and mandrel.

The ethylene-butene copolymer was identical to Example 25 and contained the 400 ppm of Kemamine AS 990. The copolymer was extruded horizontally to form a 1 inch tube with a wall thickness of 25 mils using the equipment and procedure identical to that in Example 25 except that the die collar and mandrel was constructed from Free Cutting Brass. The die design was identical to that in Example 25. The resin was extruded through the die at a rate of 32.4 lbs/hr at a melt temperature of 216 deg. C. Following a brief induction period, there was no melt fracture on either surface of the tube.

Further, no melt fracture was observed on either surface of the tube when the copolymer was extruded at a rate of 70 lbs/hr.

EXAMPLE 28

This example demonstrates the improved results over Example 26 by the use of Free Cutting Brass die collar and mandrel.

The ethylene-butene copolymer was identical to Example 26 and contained the 500 ppm of Kemamine AS 990. The copolymer was extruded horizontally to form a 1 inch tube with a wall thickness of 25 mils using the equipment and procedure identical to that in Example 26 except that the die collar and mandrel was constructed from Free Cutting Brass. The die design was identical to that in Example 26. The resin was extruded through the die at a rate of 42.6 lbs/hr at a melt temperature of 217 deg. C. Following a brief induction period, there was no melt fracture on either surface of the tube.

The following example illustrates the improved properties of films from narrow gap Cu/Zn configurations over those from both the conventional narrow gap dies and the currently practiced wide gap technology (U.S. Pat. Nos. 4,243,619 and 4,282,177).

EXAMPLE 29

This example demonstrates the properties of 1.5 mil (38 micron) films produced from GRSN-7047, formulated as in Example 1 and extruded at comparabale conditions using a 3 inch spiral die fitted with: a conventional 40 mil gap of chrome plated steel as described in Example 1; a 100 mil chrome plated gap as described in U.S. Pat. No. 4,282,177; and a 40 mil Free Cutting Brass configuration as described in Example 5.

|  |  | Die Gap, mil | | |
|---|---|---|---|---|
|  |  | 40 | 100 | 40 |
|  |  |  | Design | |
|  |  | Conventional | Tapered | Free Cutting Brass |
| Extrusion Rate, lbs/hr |  | 66 | 66 | 66 |
| Melt Temperature, deg. C. |  | 221 | 220 | 220 |
| Frostline Height, in. |  | 21 | 21 | 21 |
| Melt Fracture |  | Severe | None | None |
| Elmendorf Tear, | MD | 29.9 | 86 | 165 |
| gm/mil | TD | 506 | 375 | 349 |
| Dart Drop, gm/mil |  | 48 | 82 | 117 |
| Tensile Strength, | MD | 7430 | 4810 | 3410 |
| psi | TD | 3310 | 3270 | 3090 |
| Elongation, % | MD | 420 | 562 | 514 |
|  | TD | 752 | 652 | 642 |
| Tensile Impact, | MD | 1311 | 1647 | 1309 |
| psi | TD | 524 | 981 | 772 |

EXAMPLE 30

This example demonstrates the properties of 0.5 mil (12.5 micron) films produced from DEX-7653, formulated as in Example 4 and extruded at comparable conditions using a 3 inch spiral die fitted with: a 100 mil chrome plated gap as described in U.S. Pat. No. 4,282,177; and a 40 mil Free Cutting Brass configuration as described in Example 8.

|  |  | Die Gap, mil | |
|---|---|---|---|
|  |  | 100 | 40 |
|  |  |  | Design |
|  |  | Tapered | Free Cutting Brass |
| Extrusion Rate, lbs/hr |  | 66 | 66 |
| Melt Temperature, deg. C. |  | 229 | 229 |
| Frostline Height, in. |  | 21 | 21 |
| Melt Fracture |  | None | None |
| Elmendorf Tear, | MD | 195 | 525 |
| gm/mil | TD | 820 | 764 |
| Dart Drop, gm/mil |  | 112 | 182 |
| Tensile Strength, | MD | 6410 | 7890 |
| psi | TD | 2090 | 3080 |
| Elongation, % | MD | 314 | 278 |
|  | TD | 592 | 546 |
| Tensile Impact, | MD | 1539 | 1546 |
| psi | TD | 1382 | 1431 |

As will be seen from Examples 29 and 30, film products fabricated from narrow gap dies, fitted with Cu/Zn alloy surfaces for the die land region, have been found to exhibit significantly improved critical properties, such as tear resistance and dart impact, and better balance of properties in machine (MD) and transverse (TD) directions.

What is claimed is:

1. A process for substantially eliminating surface melt fracture during extrusion of a thermoplastic polymer under conditions of flow rate and melt temperature which would otherwise produce such surface melt fracture which comprises extruding said polymer through a die having a die land region defining opposing surfaces, and wherein at least one of said opposing surface is fabricated from an alloy containing 5 to 95 parts by weight zinc and 95 to 5 parts by weight of copper whereby surface melt fracture is substantially eliminated on the surface of the polymer adjacent to said zinc/copper containing alloy surface.

2. A process according to claim 1 wherein said thermoplastic polymer is a molten narrow molecular weight distribution, linear, ethylene polymer or copolymer.

3. A process according to claim 2 wherein a stabilizing additive is added to said ethylene copolymer.

4. A process according to claim 3 wherein said stabilizing additive is a fatty diethoxylated tertiary amine.

5. A process according to claim 4 wherein said fatty diethoxylated tertiary amine is added to said ethylene copolymer in an amount of about 50 to 1500 parts per million.

6. A process according to claim 2 wherein said alloy includes tin, or aluminum or lead or mixtures thereof.

7. A process according to claim 2 wherein said alloy contains about 30 to 40 parts by weight zinc and about 70 to 60 parts by weight copper.

8. A process according to claim 2 wherein said alloy surface in said die land region is provided by inserts secured to the pin and collar of said die.

9. A process according to claim 8 wherein said inserts extend the length of said die land region.

10. A process according to claim 8 wherein said inserts extend for a portion of the length of said die land region.

11. A process according to claim 2 wherein said alloy surface is provided by fabricating the die pin and die collar of said die from said alloy.

12. A process according to claim 2 wherein the distance between said die lips is up to about 0.050 inch.

13. A process according to claim 2 wherein said copolymer is a copolymer of greater than or equal to 80 mol percent of ethylene and less than or equal to 20 mol percent of at least one $C_3$ to $C_8$ alpha olefin.

14. A process according to claim 13 in which said copolymer has a melt index of greater than or equal to 0.1 to less than or equal to 5.0.

15. A process for substantially eliminating surface melt fracture during extrusion of a molten narrow molecular weight distribution, linear, ethylene copolymer, under conditions of flow rate and melt temperature which would otherwise produce such surface melt fracture which comprises extruding said polymer through a die having a die land region defining opposing surfaces and wherein at least one of said opposing surface is fabricated from an alloy containing about 30 to 40 parts by weight zinc and about 70 to 60 parts by weight copper said ethylene copolymer containing from about 50 to 1500 ppm of a fatty diethoxylated tertiary amine, whereby melt fracture is substantially eliminated on the surface of the polymer adjacent to said zinc/copper containing alloy surface.

16. A process according to claim 15 wherein said alloy surface in said die land region is provided by inserts secured to the pin and collar of said die.

17. A process according to claim 11 wherein said inserts extend the length of said die land region.

18. A process according to claim 16 wherein said inserts extend for a portion of the length of said die land region.

19. A process according to claim 15 wherein said alloy surface is provided by fabricating the die pin and die collar of said die from said alloy.

20. A process according to claim 1 wherein said thermoplastic polymer is a propylene polymer.

21. A process according to claim 20 wherein said propylene is a copolymer of greater than or equal to 85 mol percent propylene and less than or equal to 15 percent of ethylene and/or one or more of $C_3$ to $C_8$ alpha olefins.

22. A process according to claim 20 wherein said propylene polymer is a block or impact copolymer with a total weight percent of from about 70 to about 95% of propylene and a minor weight percent of from about 5 to about 30% of ethylene and/or one or more $C_3$ to $C_8$ alpha olefins.

23. A process according to claim 1 wherein said resin is subjected to an inert gas to remove moisture content prior to extrusion.

24. A process according to claim 23 wherein said inert gas is nitrogen.

25. A die for extruding thermoplastic polymers prone to melt fracture which comprises a die block having inlet means for introducing an extruder melt into said die block and outlet means for discharging molten polymer from said die block, conduit means for passing molten material from said inlet means to said outlet means, said outlet means including a land entry section and a die land, said die land having surfaces in contact with said molten polymer, at least one of said surfaces being fabricated from an alloy containing 5 to 95 parts by weight zinc and 95 to 5 parts by weight of copper whereby melt fracture is substantially eliminated on the surface of the polymer adjacent to said zinc/copper containing alloy surface.

26. A die according to claim 25 wherein said alloy includes tin, or aluminum or lead or mixtures thereof.

27. A die according to claim 25 wherein said alloy contains about 30 to 40 parts by weight zinc and about 70 to 60 parts by weight copper.

28. A die according to claim 25 wherein said alloy surface in said die land region is provided by inserts secured to the pin and collar of said die.

29. A die according to claim 28 wherein said inserts extend the length of said die land region.

30. A die according to claim 28 wherein said inserts extend for a portion of the length of said die land region.

31. A die according to claim 25 wherein said alloy surface is provided by fabricating the die pin and die collar of said die from said alloy.

32. A die according to claim 25 wherein the distance between said die lips is between about 0.005 inch to about 0.040 inch.

* * * * *